US005659801A

United States Patent [19]

Kopsaftis

[11] Patent Number: 5,659,801
[45] Date of Patent: Aug. 19, 1997

[54] METHOD AND APPARATUS FOR REPLACING RESIDENT PERIPHERAL DEVICE CONTROL MICROCODE BY DOWNLOAD VIA AN APPLICATION PROGRAM

[75] Inventor: William D. Kopsaftis, Grafton, Mass.

[73] Assignee: EMC Corporation, Hopkinton, Mass.

[21] Appl. No.: 350,555

[22] Filed: Dec. 7, 1994

[51] Int. Cl.$^6$ .................................................. G06F 13/00
[52] U.S. Cl. ......................... 395/882; 395/825; 395/892; 395/894
[58] Field of Search ....................... 395/892, 894, 395/825, 882

[56] References Cited

U.S. PATENT DOCUMENTS

| | | | |
|---|---|---|---|
| 5,045,816 | 9/1991 | Bramhall et al. | 332/105 |
| 5,257,376 | 10/1993 | Beck et al. | 395/700 |
| 5,274,815 | 12/1993 | Trissel et al. | 395/700 |
| 5,295,263 | 3/1994 | Kojima et al. | 395/650 |
| 5,307,491 | 4/1994 | Feriozi et al. | 395/700 |
| 5,327,549 | 7/1994 | Nissimov et al. | 395/425 |
| 5,367,571 | 11/1994 | Bowen et al. | 380/20 |
| 5,404,560 | 4/1995 | Lee et al. | 395/800 |

OTHER PUBLICATIONS

ANSI X3.131–1994 "Small Computer Interface –2" Jan. 31, 1994.

*Primary Examiner*—Jack B. Harvey
*Assistant Examiner*—John Travis
*Attorney, Agent, or Firm*—David N. Caracappa

[57] ABSTRACT

A peripheral device capable of replacing resident microcode with new microcode by download by an application program is disclosed. The disclosed peripheral device comprises a non-volatile memory containing the resident microcode. Further circuitry is responsive to the application program for receiving peripheral device commands. A resident processor, which is coupled to the non-volatile memory and the receiving circuitry, is responsive to the resident microcode, and includes a detector for a received initiator peripheral device command. The resident processor also includes a detector for a transfer disk drive command, which includes the new microcode, and which is received while the disk drive is in a waiting state. Further circuitry is coupled between the receiving circuitry and the non-volatile memory and is responsive to the resident processor, for entering the waiting state when an initiator command is detected, and for transferring the new microcode from the receiving circuitry into the nonvolatile memory and restarting the operation of the disk drive when a transfer disk drive command is detected. A method for operating a disk drive to replace resident microcode with new microcode by download by an application program, and an application program for replacing resident microcode in such a disk drive with new microcode by download are also disclosed.

54 Claims, 5 Drawing Sheets

METHOD AND APPARATUS FOR REPLACING RESIDENT PERIPHERAL DEVICE CONTROL MICROCODE BY DOWNLOAD VIA AN APPLICATION PROGRAM

The present invention relates to a method and apparatus for replacing the control microcode in a peripheral device by download via an application program executed on the computer system to which the peripheral device is coupled.

Computer systems generally have coupled to them peripheral devices which provide either information storage or the capability to interact with users through input/output (I/O) devices. As these peripheral devices have become more complicated, they have had special processors installed in them, called resident processors in the remainder of this application. These resident processors execute programs, called microcode in the remainder of this application, which are generally stored in a non-volatile memory in the peripheral device. One example of such a peripheral device is a magnetic disk drive, providing information storage for the computer system. Other examples of peripheral devices which often include resident processors are tape drives, optical disk drives, CDROM drives, sound and video I/O adapters, etc.

In order to upgrade performance of, or provide new features for, such peripheral devices, the control microcode may be updated via a download of new control microcode from the computer system to which the peripheral device is attached. This has generally required that the computer system send a special peripheral control command (e.g. in a SCSI disk drive, a write buffer command) to the peripheral device. However, operating systems executing on the computer system generally control all access to attached peripheral devices, allowing access only through correctly called operating system routines, and denying all other access. To update the peripheral device control microcode in a computer system running such an operating system, a special operating system routine is required. However operating systems do not in general include such routines, and such routines, if they are supplied, are generally available only for disk drives which were manufactured or provided by the manufacturer of the computer system. However, peripheral devices, in general, are supplied by manufacturers other than the manufacturer of the computer system.

Alternatively, the operating system may be shut down, and a standalone program run on the computer system which can directly access the peripheral device. However, this requires that the computer system to which the peripheral device is attached be shut down. This makes the computer system unavailable for use during the time necessary to shut down the operating system, update the control microcode in the attached peripheral device, and restart the operating system. This sequence can take a substantial amount of time, (up to several hours) during which time users may not use the computer system. For a computer system to be unavailable to users for this amount of time is generally unacceptable to the users. In addition, it may be necessary for a service engineer to be dispatched to the site of the computer system to perform the update of the resident microcode of the peripheral device while the computer system is shut down. Furthermore, the service engineer may require special equipment to perform this update. It is desirable to be able to update the resident control microcode in a peripheral device, without requiring a special operating system routine, requiring that the computer system be taken out of service or requiring a service engineer be dispatched to the computer system site with special equipment.

Application programs, those programs run by users under the control of the operating system, are permitted access to peripheral devices to exchange data with the peripheral devices. The operating system provides operating system routines, legitimately accessible to an application program, for providing such access. In response to a call by an application program to such an operating system routine, the operating system will send a specific peripheral device control command, or sequence of such commands, to the peripheral device to perform the requested access. For example, in response to a call to an operating system routine to write designated data to a designated logical block (or sequential logical blocks) on a SCSI disk drive, a write-verify disk drive control command would be generated by the computer system and transmitted to the attached disk drive in a known SCSI format. The write-verify command includes: a command portion identifying this command as a write-verify command, a first data portion representing the starting logical block on the disk drive into which data is to be written, and a second data portion representing the designated write data; In response to this command, the disk drive writes the designated write data to the designated logical block(s) on the disk drive, then immediately afterwards reads the data from the same logical block(s) and compares it to the write data to ensure that the data was written accurately.

In accordance with principles of the present invention, a peripheral device capable of replacing resident control microcode with new microcode by download by an application program includes a non-volatile memory containing the resident microcode. Further circuitry is responsive to the application program for receiving peripheral device commands. A resident processor, which is coupled to the non-volatile memory and the receiving circuitry, is responsive to the resident microcode, and includes a detector for a received initiator peripheral device command. When an initiator command is detected, a waiting state is entered in which the peripheral device is held ready to receive new microcode. The resident processor also includes a detector for a transfer peripheral device command, which includes the new microcode, received while the peripheral device is in the waiting state. Further circuitry is coupled to the non-volatile memory and is responsive to the resident processor, for transferring the new microcode from the receiving circuitry into the non-volatile memory and restarting the operation of the peripheral device when a transfer peripheral device command is detected.

In accordance with another aspect of the present invention, a method for operating such a peripheral device to replace resident microcode with new microcode by download comprises the following steps. First, the peripheral device responds to the receipt of an initiator command by entering a waiting state ready to receive new microcode. Then, if the peripheral device is in the waiting state, it responds to a transfer command, which includes the new microcode, by replacing the resident microcode with the new microcode and restarting the operation of the peripheral device.

In accordance with another aspect of the present invention, an application program for replacing resident microcode in such a peripheral device with new microcode by download comprises the following steps. First, a request is made to send an initiator command to the peripheral device. Then, a request is made to send a transfer command, including the new microcode, to the peripheral device.

Peripheral devices according to the present invention may have their resident microcode updated by any operator of the computer system to which they are attached, simply by running an appropriate application program, regardless of who the manufacturers of the computer system and the peripheral device are, because no special operating system routine is necessary. In addition, this method is simple and effective, and does not require either special equipment, or that the computer system be shut down for extended periods of time, either of which is costly.

In the following detailed description, a computer system coupled to a peripheral device in the form of a magnetic disk drive will be used to illustrate the principles of the present invention. It should be understood that any peripheral device similar to the illustrated disk drive may include, and be operated according to, the present invention.

Figure 1:
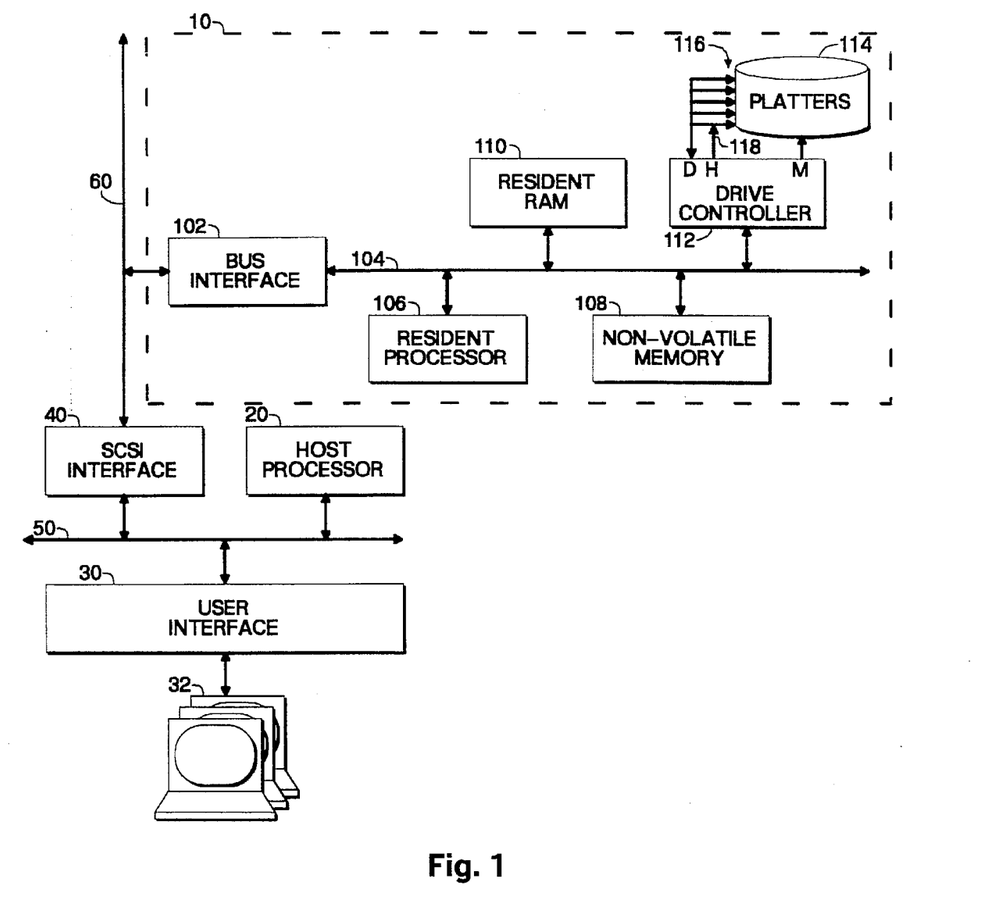
FIG. 1 is a block diagram illustrating a computer system including a disk drive in accordance with the present invention.

FIG. 1 is a block diagram illustrating a computer system including a disk drive 10 in accordance with the present invention. In FIG. 1, a host processor 20 (which may include a central processor unit, memory and control circuits, not shown) is coupled to a user interface 30 and a SCSI interface adapter 40 via a computer system bus 50 in a known manner. The user interface 30 couples a plurality of user terminals 32 to the system bus 50 in a known manner. The SCSI interface adapter 40 couples the system bus 50 to a SCSI bus 60, also in a known manner. The computer system illustrated in FIG. 1 may include other elements, such as other input/output devices, network interface adapters and/or communications devices such as modems (none of which are shown) all coupled to the system bus 50 in a known manner.

In the illustrated embodiment, the disk drive 10 may be any of model numbers ST3620N, ST31200N, ST12400N, ST32550N or ST35500N magnetic disk drives, all manufactured by Seagate Technologies, Inc. The disk drive 10 includes a SCSI bus interface circuit 102 which couples the SCSI bus 60 to a disk drive internal bus 104. Within the disk drive 10, a resident processor 106 is coupled to a non-volatile memory 108, into which the control microcode is written, and a resident read/write memory (RAM) 110 via the internal bus 104 in a known manner. In the illustrated embodiment, the resident processor is a model 80C196, manufactured by Intel Corporation. The resident bus 104 is also coupled to an electromechanical magnetic disk drive storage mechanism, through a drive controller 112. The electromechanical disk drive storage mechanism includes a plurality of magnetic storage platters 114 spun by a motor (not shown) coupled to a motor control output terminal M of the drive controller 112. A corresponding plurality of read/write heads 116 are coupled to a data input/output terminal D of the drive controller 112, and a head locator mechanism 118 is coupled to a head control output terminal H of the drive controller 112, all of which operate in a known manner.

In operation, the host processor 20 executes programs, such as operating systems and application programs which access the disk drive 10 via the SCSI interface adapter 40 and communicate with user terminals 32 via the user interface 30 in a known manner. Application programs may request access to the disk drive 10 to read data from, or write data to, the disk drive 10 via respective calls to appropriate operating system routines. In response to such requests, the respective operating system routines executing on the host processor 20 control the SCSI interface 40 to generate an appropriate disk drive control command (or sequence of commands), and transmit that disk drive control command to the SCSI bus 60, all in a known manner. Each such disk control command contains a command portion to identify the desired action, and an optional data portion, or several such portions, each containing information such as a logical block on the disk drive platters for the data, and data to be written to the disk drive.

The bus interface circuit 102 of disk drive 10 recognizes a disk control command on the SCSI bus 60, transfers the complete command from the SCSI bus 60 to a buffer in the resident RAM 110, and informs the resident processor 106 that it has received a command. The resident processor 106, under the control of the control microcode stored in the non-volatile memory 108, retrieves the disk drive command stored in the resident RAM 110, controls the electromechanical disk drive mechanism via the drive controller 112 to properly execute the command, and, if necessary, composes a response in the resident RAM 110. For example, in response to a read request, the response contains the requested data. When the command is completed, the resident processor 106 controls the bus interface 102 to return the response in the resident RAM 110 to the SCSI interface 40 via the SCSI bus 60. The SCSI interface 40 receives the response, and transfers it to the memory (not shown) in the host processor 20 for further processing. The operating system routine executing on the host processor 20 processes the received response and prepares an appropriate response to the application program which requested the disk access.

For example, if the requested access is a request to write data to the disk drive 10, the application program requests that a buffer be allocated to it in the memory (not shown) of the host processor 20, fills the allocated buffer with the data it is desired to write to the disk drive 10, then calls a disk write operating system routine passing to it the location of the buffer in the host processor memory, and a logical block on the disk drive at which it is desired to store the data. The disk write operating system routine controls the SCSI interface 40 to send a write-verify SCSI disk control command to the disk drive 10, via the SCSI bus 60. This command includes a command portion, identifying the disk control command as a write-verify command; a first data portion, identifying the logical block, or the first of consecutive sequential logical blocks, on the disk drive platters 114, which is to receive the data; and a second data portion, containing the data to be written. The SCSI interface 40 compiles and transmits a command packet containing, among other things, the command portion (write-verify command) and first data portion (logical block) of the disk control command over the SCSI bus 60. Then, e.g. using known DMA techniques, the SCSI interface 40 transmits successive data packets containing the write data from the allocated buffer in the host processor memory, over the system bus 50, to the SCSI bus 60 as the second data portion.

Figure 2:
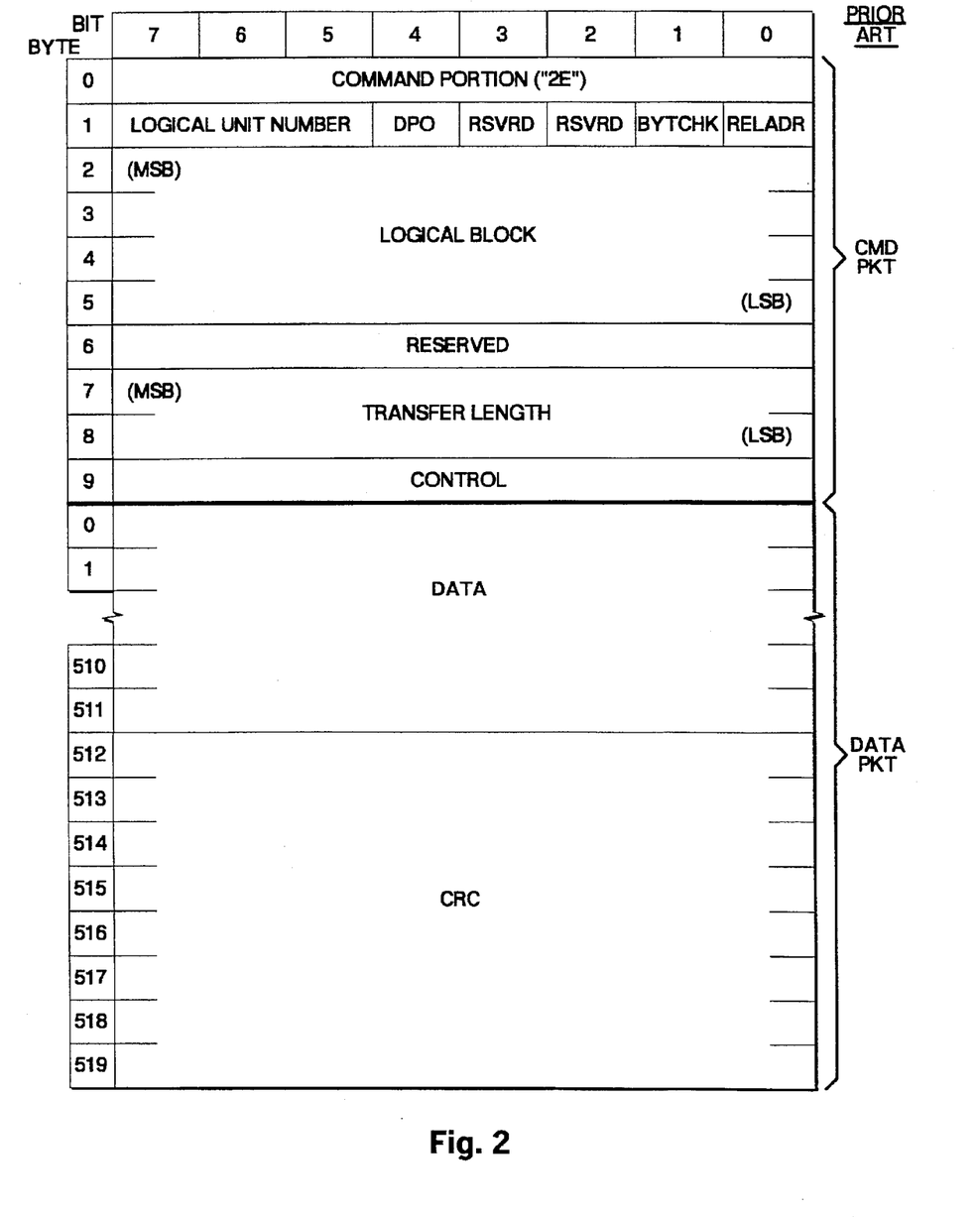
FIG. 2 is a diagram illustrating a SCSI disk control command useful in understanding the operation of the system of FIG. 1.

FIG. 2 is a diagram illustrating a portion of a known SCSI disk control command useful in understanding the operation of the system of FIG. 1. In FIG. 2, a command packet (CMD PKT), containing ten bytes, and a single following data packet (DATA PKT), containing 520 bytes is illustrated. Each byte is illustrated as a horizontal rectangle, containing eight bits. These bytes are transmitted on the SCSI bus 60 in order from the topmost byte to the bottommost byte. In the command packet (CMD PKT), the first byte (byte 0) contains the command portion, which for a write-verify command is a byte containing the hexadecimal value "2E". In the next byte (byte 1), bits 7, 6 and 5 in combination, contain data to indicate which device on the SCSI bus 60 is to respond to this command (LOGICAL UNIT NUMBER), bit 4 is a cache control data bit (DPO), bit 1 is a verification control bit (BYTCHK), and bit 0 is a relative address control bit (RELADR), with bits 2 and 3 being reserved (RSVRD). The operation of these bits is well known, and not germane to the present invention, so they will not be described in detail here. Bytes 2 through 5, in combination, contain 32 bits of data representing the logical block on the disk at which data is to be written (i.e. the first data portion). Byte 6 is reserved. Bytes 7 and 8, in combination contain 16 bits of data representing the length of the second data portion associated with this command packet (CMD PKT). Byte 9 is a control byte indicating the end of the command packet (CMD PKT). The following data packet (DATA PKT) includes an initial 512 bytes (bytes 0 through 511) of write data, followed by 8 bytes (bytes 512 through 519) of cyclic redundancy check (CRC) code data, used for error detection purposes. If more than 512 bytes of data are to be written, additional data packets will immediately follow the first one.

Referring again to FIG. 1, the bus interface 102, operating in a known manner, recognizes the disk control command packet on the SCSI bus 60, and if the logical unit number corresponds to that of the bus interface 102, transfers the complete disk control command, including the command packet and all the associated data packets, to a buffer in the resident RAM 110, e.g. using known DMA techniques, then notifies the resident processor 106 of the receipt of the command e.g. via an interrupt signal. As each successive data packet (DATA PKT) is received by the bus interface 102, the appended CRC code is checked, in a known manner, to assure the accuracy of the received data, and the CRC bytes are stripped off the data packet, leaving only the write data in the buffer in the resident RAM 110. If an error is detected in the received data, execution of the disk control command is terminated and the host processor 20 is notified via the SCSI interface 40. Otherwise the disk control command is executed.

The resident processor 106 operates in a known manner, according to a control program stored in the control microcode in the non-volatile memory 108, to execute the disk control command. In response to this control program, the resident processor 106 retrieves the command portion (byte 0 in the command packet CMD PKT of FIG. 2) of the disk control command in resident RAM 110 and identifies that command as a write-verify command. To properly execute the write-verify command, the resident processor conditions the drive controller 112 to turn on the motor via a signal at its motor control output terminal M, and to position the read/write heads 116 to the location on the platters 114 corresponding to the logical block specified in the first data portion (bytes 2 through 5 in the command packet CMD PKT of FIG. 2) of the command via a signal at the head control output terminal H.

When the drive controller 112 informs the resident processor that the motor is on and up-to-speed, and that the heads are at the correct position, the resident processor 106 conditions the drive controller 112 to access the resident RAM 110 to retrieve the data in the second data portion of the command (the write data from the data packets) from the resident RAM 110, and supply it to the read/write heads 116 via the data input/output terminal D thence to be written onto the disk drive platters 114. When the drive controller 112 indicates that the data has been written to the disk drive platters 114, the resident processor 106 conditions the drive controller 112 to read data from the same location on the disk drive platters 114 into which the write data was just written via the read/write heads 116 and compare it to the data still stored in the resident RAM 110 to verify that the data was properly written. If the data read from the disk platters 114 is different from the received write data, a write error is detected. If a write error is detected, then this write-verify cycle is repeated a predetermined number of times in an attempt to correctly write the data. Either the data will be correctly written, in which case a confirmation response message will be generated, or not, in which case a write error response message will be generated and stored in the resident RAM 110.

In either event, the resident processor 106 will finally condition the bus interface circuit 102 to place the response message previously stored in the resident RAM 110 onto the SCSI bus 60, and then conditions the drive controller 112, at least eventually, to remove power from the motor, and enter a quiescent state. The SCSI bus interface 40 receives the response message, places it in the memory of the host processor 20 and informs the operating system routine which requested the write access, e.g. via an interrupt signal. The received response is then returned to the requesting application program, which can proceed in the case of a confirmation response, or take some corrective action in the case of a write error response. Other access requests from application programs are processed in similar, also well known, manners.

In accordance with the present invention, the control microcode in the non-volatile memory 108 controls the resident processor 106 to detect a first disk control command, called the initiator command in the remainder of this application, in response to which the disk drive is placed in a state waiting to receive new control microcode. When in this waiting state, a second disk control command, called the transfer command in the remainder of this application, is detected which contains the new control microcode for the disk drive 10. When the new control microcode has been received, and its accuracy has been verified, it is stored in the non-volatile memory 108, and the disk drive restarted using the new microcode.

The command portion of the initiator command must be selected to be one that would be transmitted to the disk drive 10 in response to a disk access operating system routine legitimately called by an application program. For example, in the illustrated embodiment, a SCSI write-verify disk control command portion ("2E"), whose operation is described above, forms the command portion of the initiator command. In order to minimize interference with normal disk write requests, both the logical block on the disk drive (first data portion), and the write data (second data portion) of the initiator command have predetermined values, described below, selected so that they would practically never occur in a normal application program.

In a standard computer system, some data related to the operation of the disk drive is stored in fixed predetermined logical blocks on the disk drive itself. For example, in the illustrated embodiment, the first 256 logical blocks of the disk drive are assumed to contain such disk drive information. Application programs would generally have no reason to directly access these logical blocks. Thus, the logical block for the initiator command is selected from among these logical blocks. Specifically, in the illustrated embodiment, logical block 96 (or in hexadecimal "60") is selected to be the predetermined logical block. In addition, the write data for the initiator command is selected such that it would be rarely occur. Specifically, in the illustrated embodiment, the write data is selected to be "EMC$^2$" (or in EBCDIC encoded hexadecimal: "C5D4C3EA"). It is highly unlikely, to the point of impossibility, that this particular data would ever be written to this particular block on the disk drive 10 via a write-verify command. Thus, a write-verify command ("2E") to write the data "EMC$^2$" to logical block 96 is selected as the initiator command. Similarly, a second write-verify command to logical block 96, where the write data is the new microcode, is selected as the transfer command.

Figure 3:
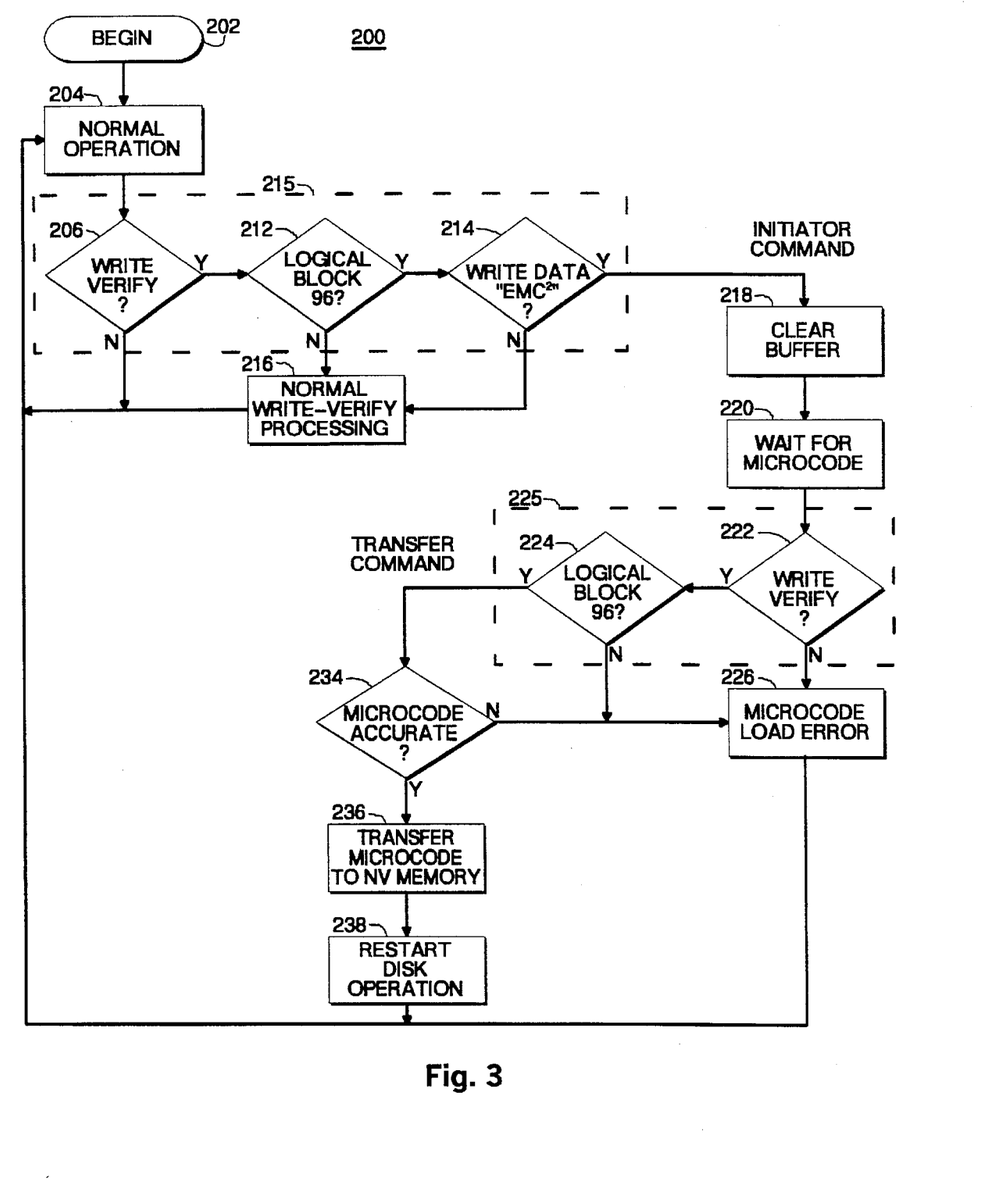
FIG. 3 is a flow diagram illustrating the operation of the resident processor in the disk drive of FIG. 1.
Figure 4:
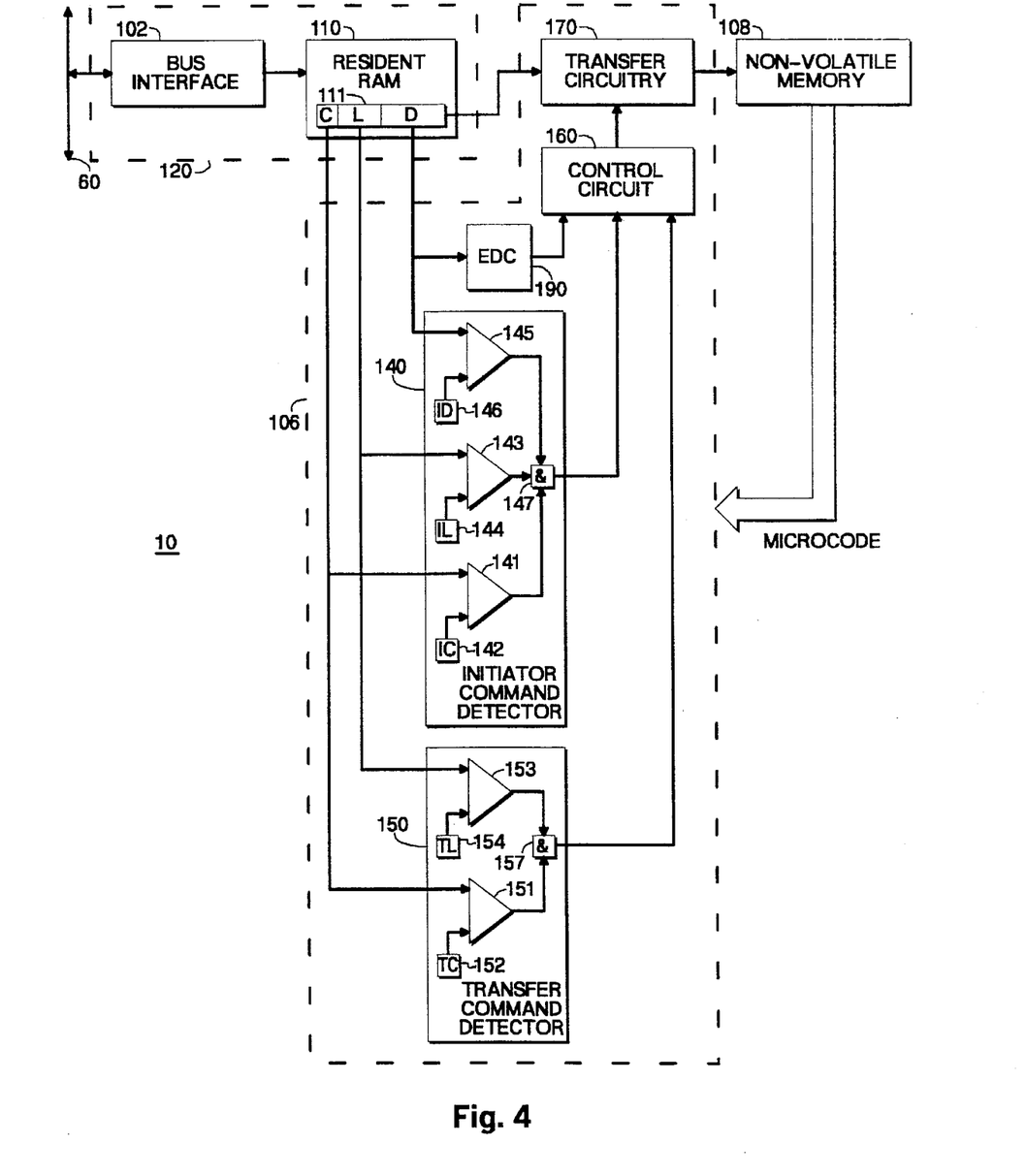
FIG. 4 is a diagram, partially in block form, and partially in functional block form, useful in understanding the operation of the resident processor in the disk drive in FIG. 1.

FIG. 3 is a flow diagram 200 illustrating a portion of the operation of the disk drive 10 (of FIG. 1) according to the present invention and FIG. 4 is a diagram, partially in block form, and partially in functional block form, useful in understanding the portion of the operation of the resident processor illustrated in FIG. 3. FIG. 3 illustrates the flow of data through the disk drive 10, and the functions performed on the data by the various elements illustrated in FIG. 4. In FIG. 4, those blocks corresponding to actual hardware elements in disk drive 10 have the same reference numbers as in FIG. 1. The other elements illustrated in FIG. 4 are meant to illustrate data processing functions, and do not correspond to actual hardware elements in the illustrated embodiment. Arrows between elements or FIG. 4 illustrate flow of data from one element or data processing function to another, and do not necessarily indicate physical electrical connections. FIG. 4 will be discussed in conjunction with FIG. 3 in the discussion below.

Referring to FIG. 4, as described above, the bus interface 102 recognizes a disk control command on the SCSI bus 60, and transfers the complete command, including the command packet and all the data packets (of FIG. 2) to a buffer 111 in the resident RAM 110. The buffer 111, thus, contains the command portion (C), the logical block (L) and the write data (D) at known respective locations in the buffer. The combination of the bus interface 102 and the resident RAM 110, illustrated by a dashed line 120, acts as a receiver for disk control commands. The resident processor 106 is illustrated as functional elements, to be described in more detail below, enclosed in a dashed line. The resident processor 106 receives microcode instructions from the non-volatile memory 108, as indicated by the broad arrow in FIG. 4. The resident processor 106 controls the transfer of data from the location in the buffer 111 in resident RAM 110 containing the write data D to the non-volatile memory 108. Although data transfers in FIG. 4 are illustrated by separate connecting lines, it should be understood that all transfers of data are made over the internal bus 104 (of FIG. 1) by any of the known transfer mechanisms used in computer systems, such as DMA or processor controlled transfers.

The portion of the operation of the resident processor 106 of disk drive 10 illustrated in FIG. 3 relates specifically to the detection, reception and storage of new microcode. This process begins in step 202, in which power-on processing is performed and any required initializations are made. In step 204, normal operation of disk drive 10 is commenced. As described above, during normal operation 204, commands may be received to read data from or write data to the disk drive or perform other operations (not described). Processing of only one of these commands, the write-verify command, is illustrated in detail in FIG. 3.

In step 206, the command portion of a newly received disk control command is compared to the predetermined command portion, for an initiator command, i.e. a write-verify command (hexadecimal "2E") in the illustrated embodiment. This is illustrated in FIG. 4 by a command comparator 141 having a first input terminal coupled to the command portion C of the buffer 111 in resident RAM 110, a second input terminal coupled to a register 142 containing the value of the write-verify command, and an output terminal. If the command portion of the newly received disk control command is not the predetermined command portion for an initiator command, then normal operation continues in step 204 to process this disk control command in a known manner. If, however, the command portion is a write-verify command, then in step 212, the logical block in first data portion of the write-verify disk control command is compared to the predetermined logical block for an initiator command, i.e. 96 in the illustrated embodiment. This is illustrated in FIG. 4 by a logical block comparator 143 having a first input terminal coupled to the logical block portion L of the buffer 111 in resident RAM 110, a second input terminal coupled to a register 144 containing the value of the predetermined logical block, and an output terminal.

If the logical block in the write-verify disk control command is not the predetermined logical block for an initiator command, then normal write-verify command processing is performed in step 216 in a known manner, as described in detail above, and when the normal processing of the write-verify command has been completed in step 216, then normal operation of the disk drive 10 is resumed in step 204. If, however, the logical block is the predetermined logical block for an initiator command, then in step 214, the write data in the second data portion of the write-verify disk control command is compared to the predetermined write data for an initiator command, i.e. "EMC$^2$" in the illustrated embodiment. This is illustrated in FIG. 4 by a write data comparator 145 having a first input terminal coupled to the write data portion D of the buffer 111 in resident RAM 110, a second input terminal coupled to a register 146 containing the value of the predetermined write data, and an output terminal.

If the write data in the write-verify disk control command is not the predetermined write data for an initiator command, then normal write-verify command processing is performed in step 216, as described above. If, however, the write data is the predetermined write data for the initiator command, then an initiator command has been detected. That is, the command portion, the logical block and the write data all have the predetermined values for an initiator command. This is illustrated in FIG. 4 by an AND gate 147 having respective input terminals coupled to the output terminals of the command comparator 141, the logical block comparator 143 and write data comparator 145, and an output terminal. A signal at the output terminal of AND gate 147 indicates that an initiator command has been detected. In executing steps 206, 212 and 214, enclosed by a dashed line 215, the resident processor 106, under the control of the resident microcode in non-volatile memory 108, operates as a detector of received initiator disk drive commands. This is illustrated in FIG. 4 by an initiator command detector block 140, containing the respective comparators (141,143,145), registers (142,144,146) and AND gate 147.

When the initiator command is detected, no transfer of data is performed to the disk drive platters 114. Instead, the disk drive enters a state ready to receive new microcode. In step 218, the resident processor 106, under the control of the resident microcode in non-volatile memory 108, clears a buffer in the resident RAM 110 of sufficient size to hold the new microcode when an initiator command is detected. In the illustrated embodiment, a buffer sufficient to hold 256 kilobytes (256 k) is cleared in the resident RAM 110. Then, in step 220, the bus interface 102 is configured by the resident processor 106 to store the next disk control command received into this newly cleared buffer in the resident RAM 110, and the disk drive 10 waits for a transfer command containing the new microcode. This is illustrated in FIG. 4 by a control circuit 160, responsive to initiator command detector 140. When the transfer command is received, it is stored in the newly cleared buffer under the control of the bus interface 102, which then notifies the resident processor 106 that the transfer command has been received.

In step 222, the command portion of the newly received disk control command is compared to the predetermined command portion of a transfer command, i.e. a write-verify command (hexadecimal "2E"). This is illustrated in FIG. 4 by a command comparator 151 having a first input terminal coupled to the command portion C of the buffer 111 in resident RAM 110, a second input terminal coupled to a register 152 containing the value of the write-verify command, and an output terminal. If the command portion of the newly received disk control command is not the predetermined command portion for a transfer command, then a microcode load error has occurred. In step 226, a microcode load error response message is prepared and stored in the resident RAM 110 by the resident processor 110, which then conditions the bus interface 102 to return that response message to the SCSI interface adapter 40 via the SCSI bus 60, as described above. Then normal operation resumes in step 204. If, however, the command portion is the predetermined command portion for a transfer command, then in step 224, the logical block in the first data portion of the write-verify disk control command is compared to the predetermined logical block for a transfer command, i.e. 96 in the illustrated embodiment. This is illustrated in FIG. 4 by a logical block comparator 153 having a first input terminal coupled to the logical block portion L of the buffer 111 in resident RAM 110, a second input terminal coupled to a register 154 containing the value of the predetermined logical block, and an output terminal.

If the logical block in the write-verify disk control command is not the predetermined logical block for a transfer command, then a microcode load error has occurred. It is handled in step 226, as described above, and normal operation is resumed in step 204. If, however, the logical block is the predetermined logical block for the transfer command, then a transfer command has been detected and the write data in the second data portion of the write-verify command is the new microcode. That is, the command portion and the logical block both have the predetermined values for a transfer command. This is illustrated in FIG. 4 by and AND gate 157 having respective input terminals coupled to the output terminals of the command comparator 151 and the logical block comparator 153 and an output terminal. A signal at the output terminal of AND gate 157 indicates that a transfer command has been detected. In executing steps 222 and 224, enclosed by a dashed line 225, the resident processor 106, under the control of the resident microcode in non-volatile memory 108, operates as a detector of received transfer disk drive commands. This is illustrated in FIG. 4 by a transfer command detector block 150, containing the respective comparators (151,153), registers (152,154) and AND gate 157. Also in FIG. 4, the control circuit 160 is responsive to the transfer command detector 150. If an initiator command was previously detected by initiator command detector 140, then a transfer command is detected by transfer command detector 150, then new microcode is contained in the data portion D of the buffer 111 in resident RAM 110.

In step 234, the resident processor 106, verifies the accuracy of the microcode in the buffer of the resident RAM 110 by testing the amount of write data received, and by the use of an error detection code included with the microcode. In the illustrated embodiment, the write data portion must contain 256 k bytes of data. In addition, in the illustrated embodiment, the error detection code is a checksum appended to the microcode, in a known manner. If either amount of write data is incorrect or the checksum indicates that the newly received microcode is not accurate, then an error has occurred. This is illustrated in FIG. 4 by an error detecting code (EDC) block 190 coupled between the data portion D of the buffer 111 in resident RAM 110 and the control circuit 160. The EDC block 190 analyzes the data in the data portion D of the buffer 111 of the resident RAM 110 by verifying its size and by calculating a checksum over the data in a known manner. If an error is detected, a signal is supplied to the control circuit 160. The error is handled in step 226 as described above, and normal operation is resumed in step 204. If the amount of write data is correct and the checksum indicates that the newly received microcode is accurate, then in step 236, the new microcode is transferred from resident RAM 110 to the non-volatile memory 108, in a known manner. This is illustrated in FIG. 4 by transfer circuitry 170 coupled between the data portion D of the buffer 111 in resident RAM 110 and the non-volatile memory 108. When control circuitry 160 has received respective signals indicating a valid initiator command, a valid transfer command and that the data is accurate, then the transfer circuitry 170 is activated, to transfer the new microcode from the data portion D of the buffer 111 in resident RAM 110 to the non-volatile memory 108. In step 238, the resident processor 106 restarts using the new microcode, and when all necessary initializations have been performed, normal operation is again initiated in step 204.

Figure 5:
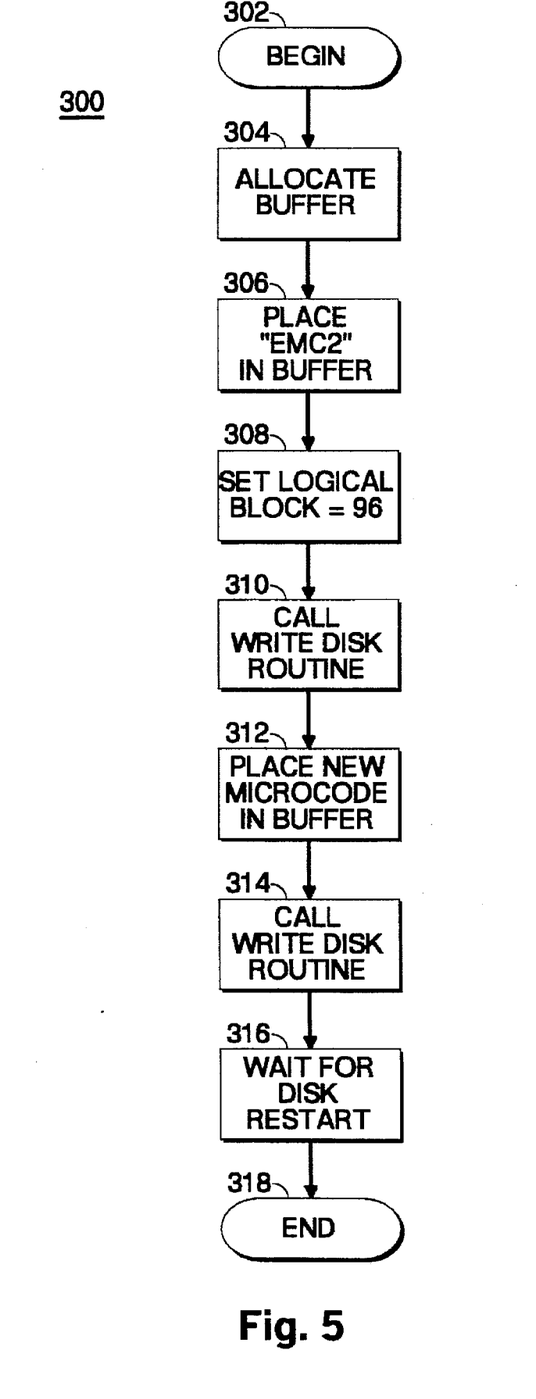
FIG. 5 is a flow diagram illustrating the operation of an application program which may be used to transfer new microcode to a disk drive according to the present invention, as illustrated in FIG. 1.

FIG. 5 is a flow diagram 300 illustrating the operation of an application program which may be used to transfer new microcode to a disk drive 10 (of FIG. 1) according to the present invention. In FIG. 5, only the portion of the application program actually involved in transferring new microcode to a disk drive 10 is illustrated. The application program begins in step 302 during which any required initializations are performed, and the state of the computer system is adjusted to permit proper loading of new microcode to the disk drive 10. For example, it is preferable to initially execute a disk status inquiry to verify that the disk drive 10 has an appropriate serial number and a current version of resident microcode which will correctly detect and process initiator and transfer commands. Then, it may be necessary for the system administrator to temporarily halt system activity, to prevent attempts to access a disk drive whose microcode is being updated. (This is not the same as shutting down the computer system and/or stopping execution of the operating system, but instead is a temporary halt of system activity using an existing operating system routine.)

In step 304, a buffer is allocated for the write data in the memory (not shown) of the host processor 20 (of FIG. 1). In step 306, the predetermined data for the initiator command, e.g. "EMC$^2$" in the illustrated embodiment, is stored in the allocated buffer. In step 308 a logical block variable is set to the predetermined logical block for the initiator command, e.g. 96 in the illustrated embodiment. In step 310, the disk write operating system routine is called with the logical block variable set to 96, and the data in the buffer being "EMC²". This is detected as an initiator command in the disk drive 10, in the manner described in detail above. In step 312, the new microcode, having a size of 256 k, and an appended checksum, is moved into the buffer. In step 314, the disk write operating system routine is called again. The logical block variable is still 96, and the write data is the new microcode. This is detected as a transfer command in the disk drive 10, in the manner described above. After the transfer command is transmitted, the disk drive must be given time to check the newly transferred microcode for accuracy, to transfer it from the resident RAM 110 to the non-volatile memory 108, and to restart operation of the resident processor 106 under the control of the new microcode. In step 316, the host processor 20 waits for a predetermined period of time. In the illustrated embodiment, the predetermined period of time is 60 seconds. At the end of this time, the disk drive is polled to determine that it is ready for normal operation, and the application program ends in step 318 by sending a message to the system administrator indicating that the new microcode has been downloaded. The system administrator may then restart system activity, and the system is available for processing.

It is also possible to update the microcode of more than one disk drive attached to the computer system at the same time. In such a situation, in step 302, a disk status inquiry is executed for each such disk drive to verify that each of the disk drives has an appropriate serial number and a version of microcode which will correctly recognize and process initiator and transfer commands. Then, the system administrator may temporarily stop system activity. The process illustrated in steps 304 to 316 is repeated for each disk drive whose microcode is to be updated. When all such disk drives have had their microcode updated, then the system administrator may restart system activity, in step 318, and the system is available for processing.

Although the invention has been described above in the context of a SCSI magnetic disk drive, one skilled in the art of peripheral device design will understand that any peripheral device (e.g. tape drives or optical disk drives), using any command protocol (e.g. ESDI, IDE or proprietary), which include a resident processor operating according to resident microcode stored in a non-volatile memory may, in accordance with principles of the present invention, have its control microcode updated by download using an application program executed by any operator, without requiring a special operating system routine, shutting down the operating system of the computer system or an on-site visit by a service engineer using special equipment.

What is claimed is:

1. In a computer system including a processor and a peripheral device, the processor executing an application program which interacts With the peripheral device by sending peripheral device requests to operating system routines which send corresponding peripheral device commands to the peripheral device in response to the peripheral device requests, wherein the peripheral device is capable of replacing resident microcode with new microcode by download by the application program, and comprises:

a non-volatile memory containing the resident microcode;
circuitry for receiving peripheral device commands sent by the operating system in response to peripheral device requests from the application program; and
a resident processor, coupled to the non-volatile memory and receiving circuitry, and responsive to the resident microcode, comprising:

a detector of an initiator peripheral device command from the operating system corresponding to an initiator peripheral device request from the application program;
a detector of a transfer peripheral device command from the operating system corresponding to a transfer peripheral device request from the application program including the new microcode, received while in a waiting state; and
circuitry, responsive to the initiator command detector and the transfer command detector, for entering the waiting state when an initiator peripheral device command is detected, and for transferring the new microcode from the receiving circuitry into the non-volatile memory and restarting the operation of the peripheral device when a transfer peripheral device command is detected.

2. The peripheral device of claim 1 wherein the receiving circuitry comprises:

a bus interface, coupled to an external source of the peripheral device commands; and
a resident read/write memory, coupled to the bus interface, for storing the peripheral device commands received by the bus interface.

3. The peripheral device of claim 1 wherein:

the initiator peripheral device command contains a command portion and a first data portion; and
the initiator command detector comprises:
a comparator for comparing the command portion to a predetermined command;
a comparator for comparing the first data portion to first predetermined data; and
circuitry for detecting an initiator disk drive command when the command comparator indicates the predetermined command, and the first data portion comparator indicates the first predetermined data.

4. The peripheral device of claim 3 wherein:

the initiator peripheral device command further comprises a second data portion; and
the initiator command detector further comprises:
a comparator for comparing the second data portion to second predetermined data; and
the detecting circuitry detects the initiator disk drive command when the command portion comparator indicates the predetermined command, the first data portion comparator indicates the first predetermined data, and the second data comparator indicates the second predetermined data.

5. The peripheral device of claim 4 wherein the predetermined initiator peripheral device request from the application program is a disk write request, and the corresponding initiator peripheral device command from the operating system is a write command, and the second data portion is write data.

6. The peripheral device of claim 5 wherein the predetermined initiator peripheral device command is a write-verify command.

7. The peripheral device of claim 1 wherein:

the transfer peripheral device command contains a command portion, a first data portion, and a second data portion;
the transfer command detector comprises:
a comparator for comparing the command portion to a predetermined command;
a comparator for comparing the first data portion to predetermined data; and circuitry for detecting a transfer peripheral device command when the command portion comparator indicates the predetermined command, and the first data portion comparator indicates the predetermined data; and the transferring circuitry transfers the second data portion to the non-volatile memory as the new microcode when a transfer disk drive command is detected.

8. The peripheral device of claim 7 wherein the predetermined transfer peripheral device request from the application program is a disk write request, and the corresponding transfer peripheral device command from the operating system is a write command and the second data portion is write data.

9. The peripheral device of claim 8 wherein the predetermined peripheral device command is a write-verify command.

10. The peripheral device of claim 7 wherein:

the second data portion includes an error detection code; and the resident processor further includes circuitry for analyzing the second data portion to detect errors using the error detecting code and if an error is detected, abandoning replacing the resident microcode with new microcode.

11. The peripheral device of claim 10 wherein:

the write data portion has a size; and the analyzing circuitry further includes circuitry for comparing the size of the write data portion to a predetermined size, and if the size of the write data portion is not the predetermined size, abandoning replacing the resident microcode with new microcode.

12. The peripheral device of claim 1 wherein the peripheral device is comprised in a magnetic disk drive.

13. The peripheral device of claim 1 wherein the peripheral device is comprised in an optical disk drive.

14. The peripheral device of claim 1 wherein the peripheral device is comprised in a tape drive.

15. A peripheral device, capable of replacing resident microcode with new microcode by download by an application program, comprising:

a non-volatile memory containing the resident microcode;

circuitry, responsive to the application program, for receiving peripheral device commands; and a resident processor, coupled to the non-volatile memory and receiving circuitry, and responsive to the resident microcode, comprising:

a detector of an initiator peripheral device command containing a command portion, a first data portion and a second data portion, the initiator command detector comprising:

a comparator for comparing the command portion to a predetermined command;

a comparator for comparing the first data portion to first predetermined data; and a comparator for comparing the second data portion to second predetermined data, wherein the second predetermined data is "$EMC^2$"; and circuitry for detecting an initiator disk drive command when the command comparator indicates the predetermined command, and the first data portion comparator indicates the first predetermined data, and the second data comparator indicates the second predetermined data;

a detector of a transfer peripheral device command, including the new microcode, received while in a waiting state; and circuitry, responsive to the initiator command detector and the transfer command detector, for entering the waiting state when an initiator peripheral device command is detected, and for transferring the new microcode from the receiving circuitry into the non-volatile memory and restarting the operation of peripheral device when a transfer peripheral device command is detected.

16. A peripheral device, capable of replacing resident microcode with new microcode by download by an application program, wherein the peripheral device is a disk drive, the peripheral device comprising:

a non-volatile memory containing the resident microcode;

circuitry, responsive to the application program, for receiving peripheral device commands; and a resident processor, coupled to the non-volatile memory and receiving circuitry, and responsive to the resident microcode, comprising:

a detector of an initiator peripheral device command containing a command portion and a first data portion, wherein the first data portion contains a disk drive location, the initiator command detector comprising:

a comparator for comparing the command portion to a predetermined command;

a comparator for comparing the first data portion to first predetermined data, wherein the first predetermined data is a predetermined disk drive location which is in a portion of the disk drive containing data related to the operation of the disk drive; and circuitry for detecting an initiator disk drive command when the command comparator indicates the predetermined command, and the first data portion comparator indicates the first predetermined data;

a detector of a transfer peripheral device command, including the new microcode, received while in a waiting state; and circuitry, responsive to the initiator command detector and the transfer command detector, for entering the waiting state when an initiator peripheral device command is detected, and for transferring the new microcode from the receiving circuitry into the non-volatile memory and restarting the operation of the peripheral device when a transfer peripheral device command is detected.

17. The peripheral device of claim 16 wherein the predetermined location is logical block 96.

18. A peripheral device, capable of replacing resident microcode with new microcode by download by an application program, wherein the peripheral device is a disk drive comprising:

a non-volatile memory containing the resident microcode;

circuitry, responsive to the application program, for receiving peripheral device commands; and a resident processor, coupled to the non-volatile memory and receiving circuitry, and responsible to the resident microcode, comprising:

a detector of an initiator peripheral device command;

a detector of a transfer peripheral device command containing a command portion, a first data portion containing a disk drive location, and a second data portion including the new microcode, received while in a waiting state, the transfer command detector comprising:

a comparator for comparing the command portion to a predetermined command;

a comparator for comparing the first data portion to predetermined data, wherein the predetermined data is a predetermined disk drive location which is in a portion of the disk drive containing data related to the operation of the disk drive; and circuitry for detecting a transfer peripheral device command when the command portion comparator indicates the predetermined command, and the first data portion comparator indicates the predetermined data; and circuitry, responsive to the initiator command detector and the transfer command detector, for entering the waiting state when an initiator peripheral device command is detected, and for transferring the second data portion including the new microcode from the receiving circuitry into the non-volatile memory and restarting the operation of the peripheral device when a transfer peripheral device command is detected.

19. The peripheral device of claim 18 wherein the predetermined location is logical block 96.

20. A method of operating a peripheral device responsive to peripheral device commands corresponding to peripheral device requests from an application program, to replace resident microcode with new microcode by download comprising the steps of:

responding to an initiator peripheral device command, corresponding to an initiator peripheral device request by the application program, by entering a waiting state ready to receive new microcode; and if in the waiting state, responding to a transfer peripheral device command, including the new microcode, corresponding to a transfer peripheral device request by the application program, by replacing the resident microcode with the new microcode and restarting the operation of the peripheral device.

21. The method of claim 20 wherein, the step of responding to an initiator peripheral device command comprises the steps of:

receiving an initiator peripheral device command containing a command portion and a first data portion;

checking the command portion to determine if it is a predetermined peripheral device command;

checking the first data portion to determine if it is first predetermined data; and if the command portion is the predetermined peripheral device command and the first data portion is the first predetermined data, recognizing and responding to an initiator peripheral device command.

22. The method of claim 21 wherein:

the initiator peripheral device command further includes a second data portion; and the method further comprises the steps of:

checking the second data portion to determine if it is second predetermined data; and if the command portion is the predetermined peripheral device command, the first data portion is the first predetermined data and the second data portion is the second predetermined data, recognizing and responding to an initiator peripheral device command.

23. The method of claim 22 wherein:

the initiator peripheral device command is a write command, and the second data portion is a write data; and the step of checking the command portion comprises the step of comparing the command portion to a write command.

24. The method of claim 23 wherein the step of checking the command portion comprises the step of comparing the command portion to a write-verify command.

25. The method of claim 20 wherein the step of responding to a transfer peripheral device command comprises the steps of:

receiving a transfer peripheral device command containing a command portion, a first data portion, and a second data portion;

checking the command portion to determine if it is a predetermined command;

checking the first data portion to determine if it is predetermined data; and if the command portion is the predetermined command, and the disk drive location portion is the predetermined location, then using the second data portion as the new microcode and performing the replacing and restarting step.

26. The method of claim 25 wherein the step of checking the command portion comprises the step of checking to determine if the command portion is a write command.

27. The method of claim 26 wherein the step of checking the command portion comprises the step of checking to determine if the command portion is a write-verify command.

28. The method of claim 25 wherein:

the receiving step further comprises the step of receiving the transfer peripheral device command containing the second data portion including an error detection code; and the method further includes, before the replacing step, the steps of:

detecting errors in the second data portion, using the error detecting code; and if an error is detected, abandoning replacing the resident microcode with new microcode.

29. The method of claim 28 wherein:

the receiving step further comprises the step of receiving the transfer peripheral device command containing the second data portion having a length;

the error detecting step further comprises the step of comparing the length of the second data portion to a predetermined length; and the abandoning step further comprises the step of, if the length of the second data portion is not the predetermined length, abandoning replacing the resident microcode with new microcode.

30. The method of claim 20 wherein the peripheral device is comprised in an magnetic disk drive.

31. The method of claim 20 wherein the peripheral device is comprised in an optical disk drive.

32. The method of claim 20 wherein the peripheral device is comprised in a tape drive.

33. The method of claim 20 wherein the peripheral device comprises a resident read/write memory, and the method further comprises, after the step of responding to an initiator peripheral device command, the step of clearing a buffer in the read/write memory to contain the transfer command.

34. A method of operating a peripheral device to replace resident microcode with new microcode by download comprising the steps of:

responding to an initiator command, comprising the steps of:

receiving a peripheral device command containing a command portion a first data portion and a second data portion;

checking the command portion to determine if it is a predetermined command;

checking the first data portion to determine if it is first predetermined data; and checking the second data portion to determine if it is second predetermined data by comparing the second data portion to the predetermined data of: "$EMC^2$"; and if the command portion is the predetermined command, the first data portion is the first predetermined data and the second data portion is the second predetermined data, recognizing and responding to an initiator command by entering a waiting state ready to receive new microcode; and if in the waiting state, responding to a transfer command, including the new microcode, by replacing the resident microcode with the new microcode and restarting the operation of the peripheral device.

35. A method of operating a peripheral device to replace resident microcode with new microcode by download, wherein the peripheral device is a disk drive, the method comprising the steps of:

responding to an initiator command, comprising the steps of:

receiving a peripheral device command containing a command portion and a first data portion wherein the first data portion is a disk drive location portion;

checking the command portion to determine if it is a predetermined command;

checking the first data portion to determine if it is first predetermined data by comparing the disk drive location portion to a predetermined location being in a portion of the disk drive containing data related to the operation of the disk drive; and if the command portion is the predetermined command and the first data portion is the first predetermined data, recognizing and responding to an initiator command by entering a waiting state ready to receive new microcode; and if in the waiting state, responding to a transfer command, including the new microcode, by replacing the resident microcode with the new microcode and restarting the operation of the peripheral device.

36. The method of claim 35 wherein the step of checking the disk drive location portion comprises the step of comparing the disk drive location portion to the predetermined location of logical block 96.

37. A method of operating a peripheral device to replace resident microcode with new microcode by download, wherein the peripheral device is a disk drive, comprising the steps of:

responding to an initiator command by entering a waiting state ready to receive new microcode; and if in the waiting state, responding to a transfer command including the Dew microcode, comprising the steps of:

receiving a peripheral device command containing a command portion, a first data portion, wherein the first data portion is a disk drive location, and a second data portion;

checking the command portion to determine if it is a predetermined command;

checking the first data portion by comparing the disk drive location to a predetermined location being in a portion of the disk drive containing data related to the operation of the disk drive; and if the command portion is the predetermined command, and the disk drive location portion is the predetermined location, then using the second data portion as the new microcode and replacing the resident microcode with the new microcode and restarting the operation of the peripheral device.

38. The method of claim 37 wherein the step of checking the disk drive location portion comprises the step of comparing the disk drive location portion to the predetermined location of logical block 96.

39. In a computer system executing an operating system and an application program interacting with a peripheral device by sending peripheral device requests to the operating system, which sends corresponding peripheral device commands to the peripheral device, a method for replacing resident microcode in the peripheral device with new microcode by download by the application program, which comprises the following steps:

sending an initiator peripheral device request to the operating system conditioning the operating system to send an initiator peripheral device command to the peripheral device; and sending a transfer peripheral device request to the operating system, conditioning the operating system to send a transfer peripheral device command, including the new microcode, to the peripheral device.

40. The method of claim 39 wherein the step of sending an initiator peripheral device request comprises the step of sending a write peripheral device request, conditioning the operating system to send a write peripheral device command to the peripheral device.

41. The method of claim 40 wherein the step of sending an initiator peripheral device request comprises the step of sending a write-verify peripheral device request, conditioning the operating system to send a write-verify peripheral device command to the peripheral device.

42. The method of claim 40 wherein the step of sending an initiator peripheral device request comprises the step of sending predetermined write data to be included With the peripheral device command corresponding with the peripheral device write request.

43. The method of claim 39 wherein:

the peripheral device is a disk drive; and the step of sending an initiator peripheral device request comprises the step of including a request for a disk access to a predetermined location on the disk drive.

44. The method of claim 39 wherein the step of sending a transfer peripheral device request comprises the steps of:

sending a peripheral device write request to the operating system; and sending the new microcode to the operating system as write data associated with the peripheral device write request.

45. The method of claim 44 wherein the step of sending a transfer peripheral device request comprises the step of sending a write-verify peripheral device request conditioning the operating system to send a write-verify peripheral device command to the peripheral device.

46. The method of claim 44 wherein the step of requesting that the new microcode be sent to the peripheral device comprises the step of including an error detecting code with the new microcode.

47. The method of claim 46 wherein the step of sending the new microcode to the peripheral device comprises the step of sending the new microcode having a predetermined length.

48. The method of claim 39 wherein:

the peripheral device is a disk drive; and the step of sending a transfer peripheral device request conditioning the operating to send a transfer peripheral device command to the peripheral device comprises the step of requesting a disk access to a predetermined location on the disk drive.

49. A method for replacing resident microcode in a peripheral device with new microcode by download by an application program comprising the following steps:

requesting a initiator command, which is a peripheral device write command with associated predetermined write data of "$EMC^2$", be sent to the peripheral device; and requesting a transfer command, including the new microcode, be sent to the peripheral device.

50. A method for replacing resident microcode in a peripheral device with new microcode by download by an application program, wherein the peripheral device is a disk drive, comprising the following steps:

requesting an initiator command requesting disk access to a predetermined location on the disk drive being in a portion of the disk drive containing data related to the operation of the disk drive be sent to the peripheral device; and requesting a transfer command, including the new microcode, be sent to the peripheral device.

51. The method of claim 50 wherein step of requesting an initiator command comprises the step of requesting disk access to logical block 96.

52. A method for replacing resident microcode in a peripheral device with new microcode by download, wherein the peripheral device is a disk drive, by an application program comprising the following steps:

requesting a initiator command be sent to the peripheral device; and requesting a transfer command requesting disk access to a predetermined location on the disk drive being in a portion of the disk drive containing data related to the operation of the disk drive, and including the new microcode, be sent to the peripheral device.

53. The method of claim 52 wherein step of requesting an initiator command comprises the step of requesting disk access to logical block 96.

54. A method for replacing resident microcode in a peripheral device with new microcode by download by an application program comprising the following steps:

requesting that the peripheral device status be retrieved from the peripheral device;

verifying from the retrieved peripheral device status that the peripheral device has an appropriate serial number and resident microcode;

if the serial number or resident microcode are not appropriate, then abandoning replacing the resident microcode in the peripheral device;

requesting a initiator command be sent to the peripheral device; and requesting a transfer command, including the new microcode, be sent to the peripheral device.

* * * * *